US007290267B2

United States Patent
Brown et al.

(10) Patent No.: US 7,290,267 B2
(45) Date of Patent: Oct. 30, 2007

(54) MULTI-PROTOCOL OBJECT DISTRIBUTION

(75) Inventors: Kyle G. Brown, Apex, NC (US); Michael A. Perks, Austin, TX (US); Sean M. Sundberg, Waco, TX (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 10/055,546

(22) Filed: Jan. 23, 2002

(65) Prior Publication Data

US 2003/0140180 A1  Jul. 24, 2003

(51) Int. Cl.
*G06F 9/46* (2006.01)

(52) U.S. Cl. .............. 719/330; 719/315; 709/217; 709/230

(58) Field of Classification Search ........... 719/315, 719/330, 328; 709/201–203, 217, 227–230
See application file for complete search history.

(56) References Cited

U.S. PATENT DOCUMENTS

| 5,491,800 | A  | * | 2/1996  | Goldsmith et al. ......... 709/221 |
| 5,511,197 | A  | * | 4/1996  | Hill et al. ................... 719/328 |
| 5,515,508 | A  | * | 5/1996  | Pettus et al. ................ 709/203 |
| 5,701,415 | A  | * | 12/1997 | Wei ............................ 719/328 |
| 5,724,588 | A  | * | 3/1998  | Hill et al. ................... 719/328 |
| 5,887,172 | A  | * | 3/1999  | Vasudevan et al. ......... 719/328 |
| 6,249,822 | B1 | * | 6/2001  | Kays et al. ................. 719/330 |
| 6,347,342 | B1 | * | 2/2002  | Marcos et al. ............. 719/315 |
| 6,408,342 | B1 | * | 6/2002  | Moore et al. ............... 719/330 |
| 6,446,137 | B1 | * | 9/2002  | Vasudevan et al. ......... 719/330 |
| 6,487,607 | B1 | * | 11/2002 | Wollrath et al. ........... 719/330 |
| 6,757,899 | B2 | * | 6/2004  | Zhdankin et al. .......... 719/315 |
| 6,782,542 | B1 | * | 8/2004  | Mein et al. ................ 719/330 |
| 6,839,897 | B2 | * | 1/2005  | Takagi ....................... 719/330 |
| 6,851,118 | B1 | * | 2/2005  | Ismael et al. .............. 719/330 |
| 2003/0023577 | A1 | * | 1/2003  | Sundius et al. ............. 707/1 |

OTHER PUBLICATIONS

Clark et al. "Multi-protocol architecture as a paradigm for achieving inter-operability" 1993 IEEE, pp. 136-143.*
Dao et al. "Remote procedure call protocols for real- time systems" 1991 IEEE, pp. 216-223.*

* cited by examiner

*Primary Examiner*—Van Nguyen
(74) *Attorney, Agent, or Firm*—Gerald R. Woods, Esq.; Steven M. Greenberg, Esq.; Carey, Rodriguez, Greenberg & Paul, LLP

(57) ABSTRACT

The present invention is a multi-protocol object distribution system. The multi-protocol object distribution system can include one or more remote procedure call (RPC) transport protocol stubs; and, a meta-stub configured to select individual ones of the RPC transport protocol stubs through which distributed object services can be provided to requesting clients in the object distribution system. The RPC transport protocol stubs can include both a default RPC transport stub, and at least one other RPC transport stub which the meta-stub can select based upon changing conditions in the object distribution system. Importantly, the meta-stub can automatically select the default RPC transport stub by default.

6 Claims, 2 Drawing Sheets

MULTI-PROTOCOL OBJECT DISTRIBUTION

BACKGROUND OF THE INVENTION

1. Statement of the Technical Field

The present invention relates to the field of distributed computing and more particularly to the selection of a remote procedure call protocol with which access can be provided to services in a distributed object.

2. Description of the Related Art

Recent efforts in distributed computing address the development of a general-purpose distributed computing infrastructure, integrated security, availability, scalability, reliability, and manageability for general distributed computing applications. In the past decade, the development of a general-purpose distributed computing infrastructure has taken divergent paths—each path adhering to a particular remote procedure call protocol. A first approach to distributed computing incorporated the distributed component object model (DCOM), while the second approach to distributed computing incorporated the Common Object Request Broker Architecture (CORBA) and its close cousin, Java Remote Method Invocation (RMI) over the Internet Inter-ORB Protocol (IIOP).

In order to integrate both approaches in a heterogeneous distributed network architecture, DCOM/CORBA bridges were developed. As departmental and enterprise level networks typically incorporated only one of the DCOM or CORBA (or Java RMI) protocols, bridges and message-oriented middleware were viewed as suitable systems integration technologies. The rise of the Web application, however, has posed new challenges for systems integrators as information technologists now expect the ability to invoke remote services from a client process without regard for the platform orientation of the server process. Yet, bridges and message-oriented middleware can exact a performance toll which cannot be tolerated by the Quality of Service (QoS) requirements of many emerging Web applications.

In response, the Simple Object Access Protocol (SOAP) has been developed to bridge the DCOM and CORBA remote procedure call technologies. SOAP is an XML-based message exchange format that is platform neutral. Accordingly, SOAP permits the initiation of information sharing relationships among disparate parties, across different platforms, languages and programming environments. Importantly, SOAP is not a competitive technology to component systems and object-request broker architectures such as CORBA and DCOM, but rather complements these technologies. In particular, while CORBA, DCOM, and Enterprise Java enable resource sharing within a single organization, SOAP technology aims to bridge the sharing of resources among disparate organizations possibly located behind firewalls.

Similar to Java RMI-IIOP, SOAP applications exploit a synchronous wire-protocol (typically HTTP) to communicate with Web services to retrieve dynamic content. Presently, existing approaches to object distribution assume that only a single remote procedure call protocol such as RMI-IIOP or HTTP/SOAP will be sufficient for all messages flowing between the client and server. Different remote procedure call protocols, however, exhibit different strengths depending upon network architecture and application. For instance, RMI-IIOP can perform well within the corporate intranet behind a firewall, but traversing a firewall often can prove problematic for RMI-IIOP. HTTP/SOAP, by comparison, works well across the firewall, but involves a modest performance deficiency as an XML parser is required to process SOAP messages. Notwithstanding, in an effort simply to enable remote services invocation, often Web services are delivered using the "lowest common denominator" approach.

SUMMARY OF THE INVENTION

The present invention is a multi-protocol object distribution system. The multi-protocol object distribution system can include one or more remote procedure call (RPC) transport protocol stubs; and, a meta-stub configured to select individual ones of the RPC transport protocol stubs through which distributed object services can be provided to requesting clients in the object distribution system. The RPC transport protocol stubs can include both a default RPC transport stub, and at least one other RPC transport stub which the meta-stub can select based upon changing conditions in the object distribution system. Importantly, the meta-stub can automatically select the default RPC transport stub by default.

In one aspect of the invention, at least one of the RPC transport protocol stubs can include a HTTP/SOAP stub. Furthermore, in yet another aspect of the invention, the HTTP/SOAP stub can be the default RPC transport protocol stub. Finally, the RPC transport protocol stubs also can include at least one other RPC transport protocol stub selected from a group including but not limited to a RMI-IIOP stub, a SOAP over Java Message Service (JMS) stub, and a SOAP over simple mail transport protocol (SMTP) over JMS stub.

In the multi-protocol object distribution system, an RPC processing method can include receiving an RPC request for services from a distributed object in a server in the multi-protocol object distribution system; establishing a communicative link with the distributed object using a default RPC transport mechanism, and querying the distributed object over the communicative link for other RPC transport mechanisms which are supported by the server; selecting one the other RPC transport mechanisms and re-establishing the communicative link with the distributed object using the selected RPC transport mechanism; and, processing the RPC request for services from the distributed object over the re-established communicative link.

Additionally, the method can include detecting a deterioration in communications over the new communicative link; further re-establishing the communicative link with the default RPC transport mechanism; and, continuing to process the RPC request for services over the further re-established communicative link. Notably, the selecting step can include determining whether the requested service implicates asynchronous or synchronous messaging; and, selecting an optimal RPC transport mechanism supported by the server based upon the determination. Also, the selecting step can include surveying network conditions; and, selecting one of the RPC transport mechanisms best suited to provide a pre-determined level of Quality of Service (QoS) in view of the surveyed network conditions.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a location transparent system for remotely invoking distributed object services. In accordance with the inventive arrangements, a meta-stub can provide a client view of a distributed object, for instance an Enterprise Java Bean (EJB). The meta-stub can be configured to interact with one or more specific stubs which are configured to process client-server communications for a particular transport mechanism. In this way, the meta-stub can variably select a suitable transport mechanism according to the dynamically changing network conditions and the capabilities of individual servers hosting the distributed objects.

For instance, the meta-stub can be configured to interact with each of an RMI-IIOP stub, SOAP/HTTP stub, SOAP-SMTP and SOAP-JMS stub. In this example, the meta-stub can select an appropriate specific stub where the server hosting the distributed object supports the transport mechanism associated with the specific stub and where network conditions permit such communications. Importantly, the meta-stub can be configured to initially establish communications using a default specific stub, for example a SOAP/HTTP stub. Additionally, where the QoS associated with a selected transport mechanism falls below acceptable levels, the meta-stub can fail over to a transport mechanism associated with the default specific stub.

Figure 1:
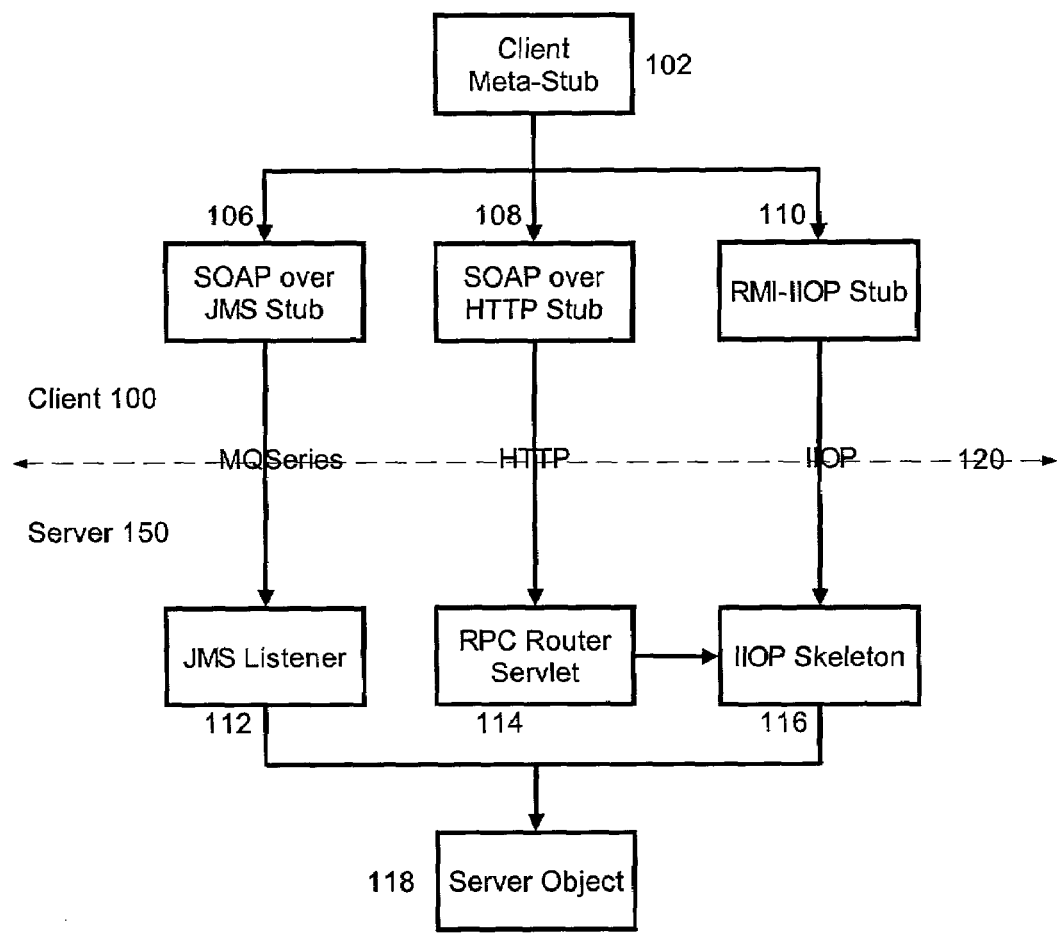
FIG. 1 is a schematic illustration of location transparent system for remotely invoking distributed object services; and, FIG. 2 is a flow chart illustrating a process for invoking the distributed services of FIG. 1.

FIG. 1 is a schematic illustration of location transparent system for remotely invoking distributed object services. The system can include both a client portion 100 and a server portion 150, communicatively linked over the data communications network 130. The client portion 100 can include a meta-stub 104 configured to access one or more specific stubs 106, 108, 110. Each specific stub 106, 108, 110 can be a conventional stub known in the art of remote procedure calls (RPCs). More particularly, each specific stub 106, 108, 110 can behave as a communications interface between the client 100 and server 150, implementing a remote procedure calling protocol.

The server 150, by comparison, can include one or more distributed objects 118, for instance an EJB, a remote procedure or other such remotely accessible services. External clients such as the client 100 can access the services of the distributed object 118 through a server-side transport mechanism 112, 114, 116. Examples of server-side transport mechanisms can include Java Message Service (JMS) listeners, RPC router servlets, IIOP skeletons, and the like. One skilled in the art will recognize, however, that each server-side transport mechanism 112, 114, 116 can include a corresponding stub 106, 108, 110 in the server 100. For example, the JMS Listener 114 can have a corresponding SOAP over JMS stub 106, while the IIOP skeleton can have a corresponding RMI-IIOP stub 110.

In operation, client-side processes can invoke remote services in the distributed objects 118. While in a conventional arrangement, the client-side process would call the remote service transparently through a specifically configured RPC stub, in the present invention, the client-side process can invoke the remote service through the meta-stub 104. Significantly, upon receipt of a request to invoke a remote service in the distributed object 118, the client meta-stub 104 can perform a process 200 of selecting a specific stub 106, 108, 110 suitable for invoking the remote service according to the capabilities of the server 150 and required levels of QoS.

Figure 2:
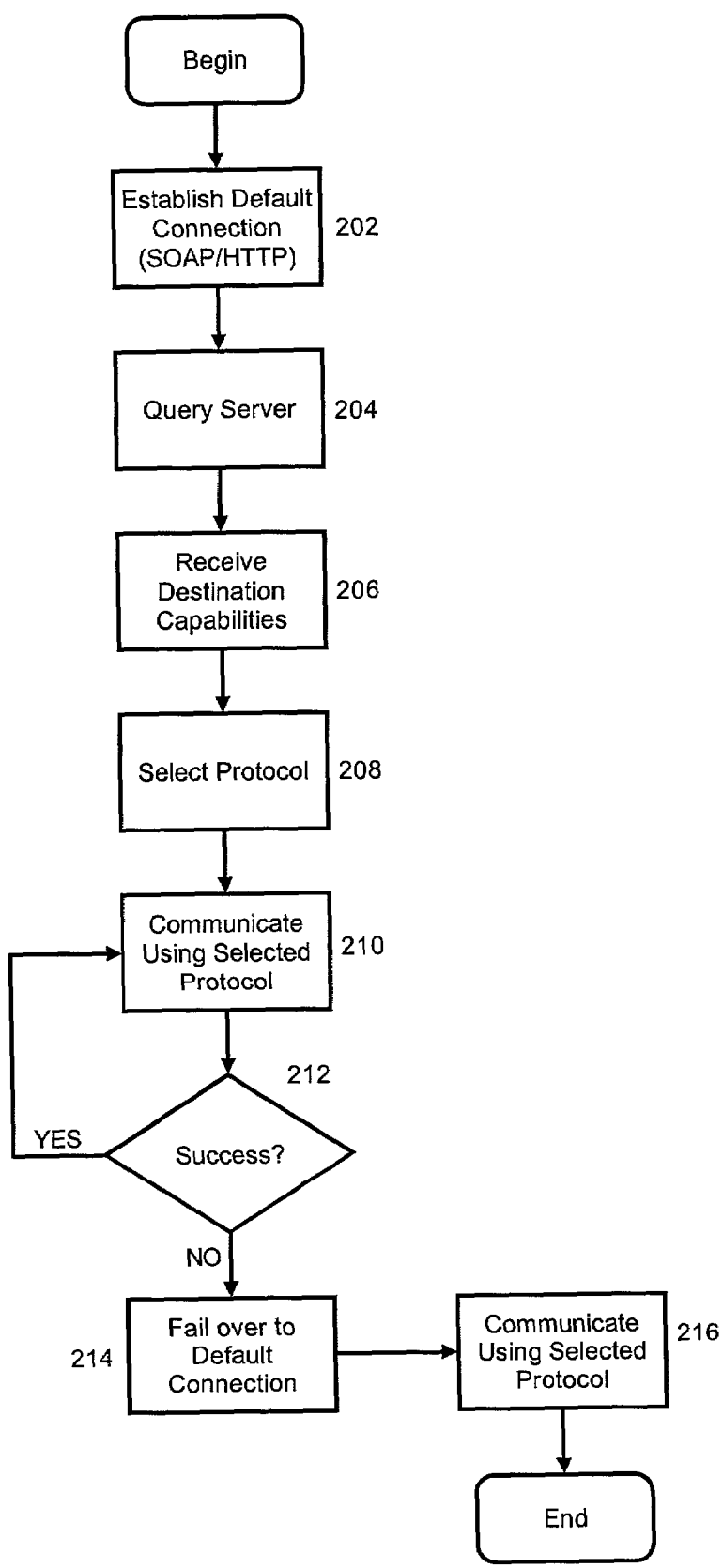

FIG. 2 is a flow chart illustrating the process 200 for invoking the remote services of the distributed objects 118 in accordance with the inventive arrangements. The process can begin in step 202 in which the meta-stub 104 can establish a default connection with the server-side transport mechanism 112, 114, 116 using a default RPC protocol. In a preferred aspect of the present invention, the default RPC protocol can be SOAP over HTTP although the invention is not limited in this regard. Rather, it is preferred albeit not required that the default RPC protocol is selected to provide a minimum required QoS level.

In step 204, once a connection with the server 150 has been established using the default RPC protocol, the server 150 can be queried for its RPC protocol capabilities. In step 206, a response to the query can be received in the meta-stub 104 and, based upon the response to the query, a particular RPC protocol can be selected in step 208 depending upon extrinsic circumstances, for example network conditions and optimal QoS levels. In step 210, communications between client 100 and server 150 can resume using the selected RPC protocol.

Periodically, in step 212 it can be determined whether client-server communications fall below acceptable QoS levels, or whether client-server communications fail altogether using the selected RPC protocol. If not, communications between client 100 and server 150 can continue using the selected RPC protocol. Otherwise, in step 214, communications between client 100 and server 150 can be re-established using the default RPC protocol and client-server communications can resume in step 216 using the default RPC protocol.

Importantly, the present invention is not limited merely to the particular method illustrated in FIG. 2. Rather, other embodiments not illustrated therein are within the scope of the invention. For example, the selected RPC protocol can be selected for reasons other than QoS. Likewise, the meta-stub 104 can revert to the default RPC protocol at any time the meta-stub 104 programmatically determines that a different RPC protocol would better suffice for client-server communications. Finally, the meta-stub 104 need not fail-over exclusively to the default RPC protocol. Rather, in one aspect of the invention, the meta-stub 104 can algorithmically fail-over to a next-best selection. In particular, for specific asynchronous communication requirements, the meta-stub can select an RPC protocol such as SMTP or SOAP over JMS as appropriate.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a multi-protocol object distribution system, a remote procedure call (RPC) processing method comprising:
    receiving an RPC request for services from a distributed object in a server in the multi-protocol object distribution system;
    establishing a communicative link with said distributed object using a default RPC transport mechanism, and querying said distributed object over said communicative link for other RPC transport mechanisms which are supported by said server;
    selecting one said other RPC transport mechanisms and re-establishing said communicative link with said distributed object using said selected RPC transport mechanism;
    processing said RPC request for services from said distributed object over said re-established communicative link;
    detecting a deterioration in communications over said re-established communicative link;
    further re-establishing said communicative link with said default RPC transport mechanism; and
    continuing to process said RPC request for services over said further re-established communicative link.

2. The method of claim 1, wherein said selecting step comprises:
    determining whether said RPC request for services implicates asynchronous or synchronous messaging; and,
    selecting an optimal RPC transport mechanism supported by said server based upon said determination.

3. The method of claim 1, wherein said selecting step comprises:
    surveying network conditions; and,
    selecting one of said RPC transport mechanisms best suited to provide a pre-determined level of Quality of Service (QoS) in view of said surveyed network conditions.

4. A machine readable storage having stored thereon a computer program for performing remote procedure call (RPC) processing in a multi-protocol object distribution system, the computer program comprising a routine set of instructions for causing the machine to perform the steps of:
    receiving an RPC request for services from a distributed object in a server in the multi-protocol object distribution system;
    establishing a communicative link with said distributed object using a default RPC transport mechanism, and querying said distributed object over said communicative link for other RPC transport mechanisms which are supported by said server;
    selecting one said other RPC transport mechanisms and re-establishing said communicative link with said distributed object using said selected RPC transport mechanism;
    processing said RPC request for services from said distributed object over said re-established communicative link;
    detecting a deterioration in communications over said re-established communicative link;
    further re-establishing said communicative link with said default RPC transport mechanism; and
    continuing to process said RPC request for services over said further re-established communicative link.

5. The machine readable storage of claim 4, wherein said selecting step comprises:
    determining whether said RPC request for services implicates asynchronous or synchronous messaging; and,
    selecting an optimal RPC transport mechanism supported by said server based upon said determination.

6. The machine readable storage of claim 4, wherein said selecting step comprises:
    surveying network conditions; and,
    selecting one of said RPC transport mechanisms best suited to provide a pre-determined level of Quality of Service (QoS) in view of said surveyed network conditions.

* * * * *